May 18, 1926.
W. D. McFADDEN
1,585,255
WATER METER FOR IRRIGATION HEADS
Filed March 3, 1923
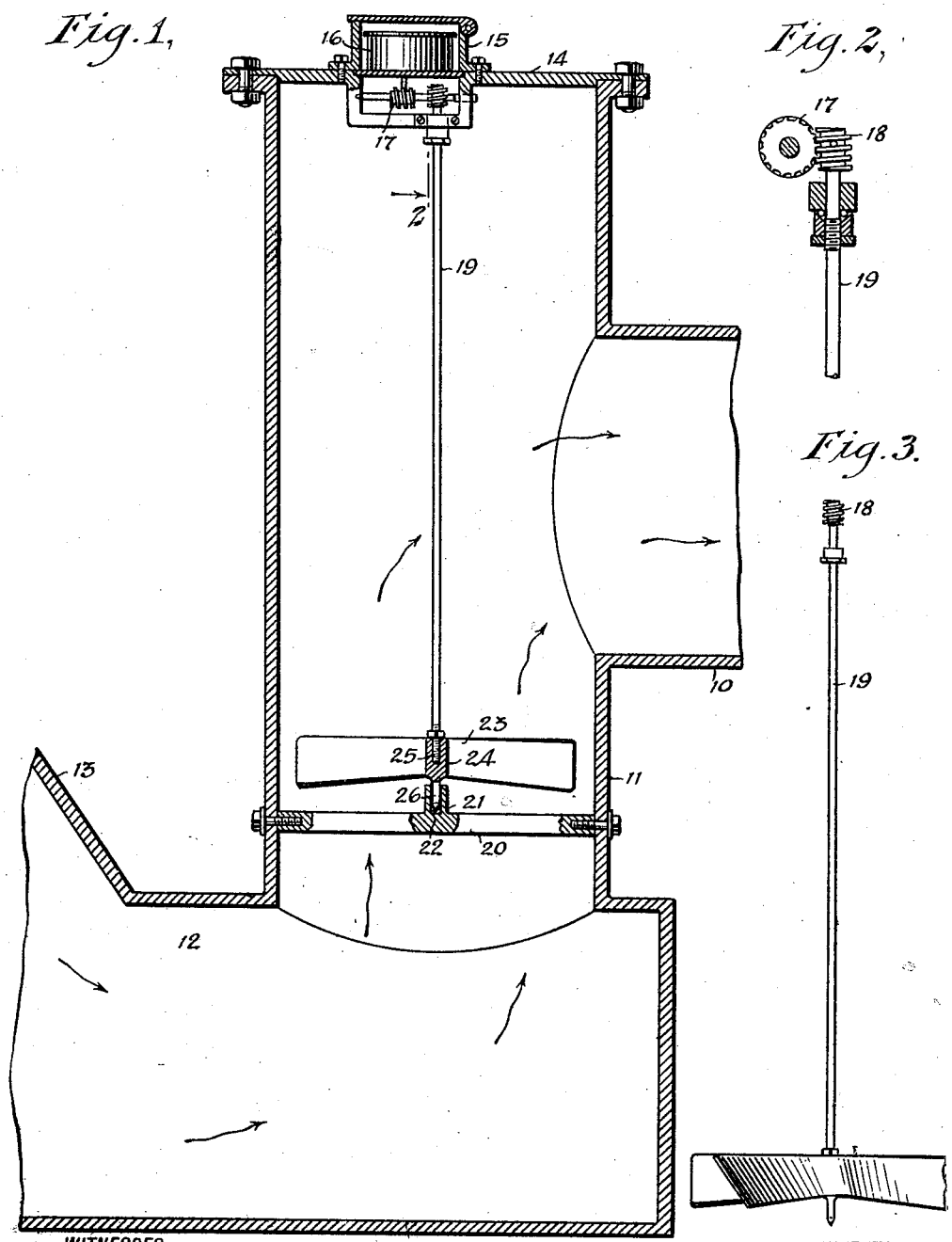
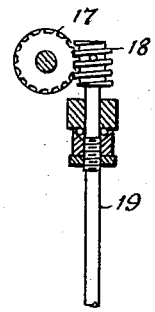
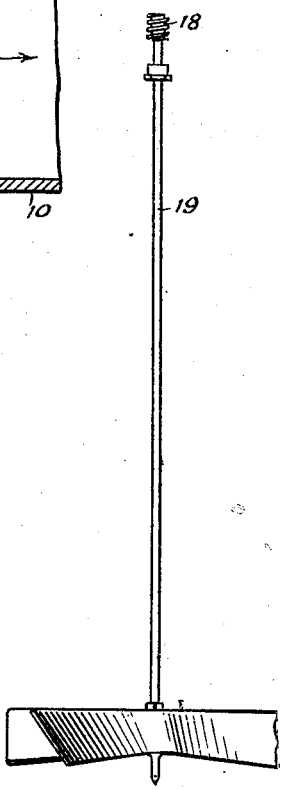
WITNESSES
INVENTOR
William D. McFadden
BY
ATTORNEYS Patented May 18, 1926.

1,585,255

UNITED STATES PATENT OFFICE.

WILLIAM DAVID McFADDEN, OF DEL MAR, CALIFORNIA.

WATER METER FOR IRRIGATION HEADS.

Application filed March 3, 1923. Serial No. 622,687.

My invention relates to a water meter for irrigation heads and particularly to a gravity type irrigation meter.

The general object of my invention is to provide a meter improved in various particulars especially with respect to an impeller and bearing unit of a character to promote precision in the action of the meter, whereby to cause it to more accurately measure the quantity of water passing through the meter than the meters of the same type as generally employed.

Reference is to be had to the accompanying drawings forming a part of this specification, it being understood that the drawings are merely illustrative of one example of the invention.

Figure 1 is a vertical section of a water meter embodying my invention;

Figure 2 is a detail in section on the line 2—2 of Figure 1;

Figure 3 is an elevation of the actuating spindle of the meter register showing the impeller and bearing unit.

In the illustrated example of the invention the numeral 10 indicates an irrigation lateral supplied by a casing 11 from suitable duct 12 connecting with a main distributing line, a fragment of which is shown as at 13. The casing 11 has on the cap 14 thereof a register casing 15 containing a suitable registering device 16, driven by any approved drive gear assemblage designated generally by the numeral 17. The initial drive element 18 of the gear assemblage is secured to the upper end of an actuating rod spindle 19 which is disposed vertically in the meter casing 11. A bearing for the rod 19 is provided in a spider 20 having a step bearing 21 which in practice has therein for a bearing seat a jewel 22.

In accordance with my invention I provide a combined impeller and bearing unit comprising an impeller 23, the hub 24 of which is suitably fastened as by a threaded connection 25 with the lower end of the rod 19. Integral with the impeller hub 24 is a depending bearing member 26 coaxial with the rod 19.

By forming the impeller and the depending bearing element 26 integral with each other, accuracy in the operation of the meter is promoted. The arrangement is such that the water passes from the source of supply by the casing 11 upwardly past the impeller 23 to the lateral 10, the bearing being thereby relieved of the pressure of the flowing water, whereby the accuracy in the operation of the meter is further promoted.

I would state in conclusion that while the illustrated example constitutes a practical embodiment of my invention, I do not limit myself strictly to the exact details herein illustrated, since, manifestly, the same can be considerably varied without departure from the spirit of the invention as defined in the appended claim.

Having thus described my invention, I claim:

A water meter comprising a vertically disposed meter casing provided with an inlet at its lower end for connection with a fluid supply pipe line and having a lateral fluid supply discharge outlet disposed thereabove, a vertically disposed register-actuating shaft mounted in said casing, a horizontally disposed impeller secured to said shaft and located in said casing between said inlet and said discharge outlet, a depending bearing element integrally formed on said impeller, a spider mounted adjacent the inlet of said casing, a step bearing on said spider in which said depending bearing element is seated, and a meter registering mechanism mounted on the upper end of said casing and operatively connected to said actuating shaft.

WM. DAVID McFADDEN.